(12) United States Patent
Caldwell

(10) Patent No.: US 7,618,547 B2
(45) Date of Patent: Nov. 17, 2009

(54) GROUNDWATER TREATMENT SYSTEM WITH AIR INJECTION INTO VADOSE ZONE

(75) Inventor: Michael Caldwell, Spring, TX (US)

(73) Assignee: Waste Management, Inc., Houston, TX (US)

( * ) Notice: Subject to any disclaimer, the term of this patent is extended or adjusted under 35 U.S.C. 154(b) by 0 days.

(21) Appl. No.: 11/710,213

(22) Filed: Feb. 23, 2007

(65) Prior Publication Data

US 2008/0203000 A1 Aug. 28, 2008

(51) Int. Cl.
*C02F 3/00* (2006.01)
(52) U.S. Cl. .................... 210/758; 435/262.5
(58) Field of Classification Search ............. 210/610, 210/620, 758; 435/262.5
See application file for complete search history.

(56) References Cited

U.S. PATENT DOCUMENTS

| 6,210,955 B1 * | 4/2001 | Hayes ............... 435/262.5 |
| 2005/0109696 A1 * | 5/2005 | Sorenson ............... 210/610 |

* cited by examiner

*Primary Examiner*—Chester T Barry
(74) *Attorney, Agent, or Firm*—McDonnell Boehnen Hulbert & Berghoff LLP

(57) ABSTRACT

This invention is directed to systems including one or more trenches or wells that include one or more perforated pipes through which a gas, such as air, can be injected into the vadose zone of ground located beyond a methaneogenic source to create a positive-pressure gas curtain and/or aerobic conditions in the vadose zone that inhibits migration of and/or facilitate the remediation of mobile volatile organic compounds that are capable of contaminating groundwater surrounding the methaneogenic source.

20 Claims, 3 Drawing Sheets

GROUNDWATER TREATMENT SYSTEM WITH AIR INJECTION INTO VADOSE ZONE

BACKGROUND OF THE INVENTION (1) Field of the Invention

This invention is directed to systems and methods for reducing groundwater contamination by volatile organic compounds where the groundwater is in close proximity to a methaneogenic source commingled with volatile organic compounds (VOCs)—such as landfills—by injecting a gas, such as air, into the unsaturated or vadose zone of soils or bedrock located outside of the methaneogenic source in order to create a positive-pressure curtain to inhibit landfill gas migration and/or to transform the subsurface environment from anaerobic to aerobic conditions in the saturated zone to facilitate the remediation of volatile organic compounds that are capable of being treated under aerobic conditions.

(2) Description of the Art

Modern landfills are designed and constructed to contain solid and liquid wastes and minimize the potential for gases (such as landfill gas) to be emitted or migrate from the containment facility. However landfill gas (which is generally composed of methane, carbon dioxide, and trace organic compounds) is a common source of localized impacts to groundwater. A few of these organic compounds (such as PCE and TCE) degrade rapidly under anaerobic conditions. Other compounds, however, (such as vinyl chloride) are relatively persistent under anaerobic conditions but degrade rapidly under aerobic conditions.

Currently, VOC migration into groundwater adjacent to landfills is minimized—to the extent that it is a problem—by either (1) mitigating migration at the source with enhanced leachate or landfill gas extraction, (2) treating VOC contaminated groundwater to remove VOCs; or (3) by applying oxidizing agents or other remediation chemicals into the landfill to enhance aerobic bioremediation and reduce the anthropogenic VOCs into a more natural (and less of a threat to human receptor) state. The cost and complexity of these types of remediation can be high and the manpower required to operate these processes is also quite high.

There is a need, therefore, to provide technologies to address impacted groundwater from contaminants that can be addressed under both anaerobic and anaerobic conditions. Moreover, there is a need for simpler, less time-consuming and less labor-intensive methods for inhibiting the migration of volatile organic compounds from methaneogenic sources such as landfills into surrounding groundwater. Value is provided to the industry if these technologies can address the impact as a part of enhancements to the routine operation and maintenance (O&M) of landfills and other methaneogenic sources rather than as a post-impacted groundwater remediation solution.

SUMMARY OF THE INVENTION

One aspect of this invention is a system that includes a positive-pressure air curtain that physically prevents migration of methaneogenic gas (containing VOCs or in an amount) in the vadose zone—the permeable portion of the unsaturated soils or bedrock zone adjacent to a groundwater compliance point. In this manner, certain systems of this invention are implemented as an active out-of-refuse technology that can be managed to mitigate subsurface gas migration while assuring that oxygen is not introduced into the waste disposal cells.

Another aspect of this invention is to introduce air (enriched with oxygen) to the vadoze zone with the goal of increasing the oxygen content of the contact saturated zone to stimulate aerobic biodegradation of VOCs from natural microbes that flourish under more aerobic conditions. The invention is designed to use a gas (air with or without oxygen enrichment) to flow through a constructed conduit (permeable trench or series of wells installed to a depth of the top of groundwater) to induce a partitioning of oxygen from the vadoze zone to the contact groundwater that is expected to increase the dissolved oxygen content across a large surface area.

An ancillary benefit of certain systems of this invention is that influent air flow can be modified to increase or decrease oxygen content and the effluent air flow can be treated to ensure VOCs volatilized as a result of treatment can be captured and contained prior to direct discharge to the atmosphere.

Another aspect of this invention includes groundwater treatment systems comprising: a methaneogenic producing source wherein the methaneogenic producing source includes volatile organic compounds; a groundwater compliance point; a treatment zone of ground between the methaneogenic producing source and the compliance point, the treatment zone of ground including a vadose zone; a mobile volatile organic compound source at a location selected from the group consisting of in the methaneogenic producing source, in the treatment zone of ground or in both the methaneogenic producing source and in the treatment zone of ground; and at least one gas injection well for injecting gas into the vadose zone of the treatment zone of ground.

Still another aspect of this invention is a groundwater treatment system comprising: a landfill including a bottom, a top and a layer of organic waste material located above the bottom, the organic waste material including volatile organic compounds; a groundwater compliance point located outside of the perimeter of the landfill bottom wherein groundwater compliance point is capable of being contaminated with volatile organic compounds in the organic waste material layer of the landfill; a treatment zone of ground located between the landfill perimeter and the groundwater compliance point, the treatment zone of ground further comprising a vadose zone; and at least one injection well for injecting gas into the vadose zone of the treatment zone of ground located between the landfill perimeter and the groundwater compliance point.

Yet another aspect of this invention is a method for inhibiting the migration of volatile organic compounds into a groundwater compliance point comprising the steps of: placing at least one gas injection pipe into a vadose zone of a treatment zone of ground located between a methaneogenic producing source and the groundwater compliance point wherein the at least one volatile organic compound is a mobile volatile organic compound; and directing gas into the vadose zone through the at least one gas injection pipe.

DESCRIPTION OF THE CURRENT EMBODIMENT

The present invention is directed to systems and methods for remediating and/or protecting groundwater from contamination by anthropogenic organic compound impacts from methaneogenic sources such as landfills. The systems and methods of this invention when associated with landfills use both in-refuse (gas extraction wells or passive vents) and out-of-refuse solutions (including wells, trenches (vertical or horizontal), or vents) to control landfill gas emissions or migration with the primary objective to prevent explosive gases (i.e., methane) from subsurface migration to sensitive receptors (such as inhabited buildings with basements).

The term "vadose zone" is used herein to refer to the zone between the land surface and the water table within which the moisture content of the soil is less than saturation (except in capillary fringe) between the ground surface and the water table, and that has a pressure less than atmospheric. The capillary fringe is typically included within the definition of the term "vadose zone".

The term "methaneogenic producing source" is used herein to refer to any man made or natural feature or structure that generates methane gas that penetrates into the vadose zone. Examples of methaneogenic sources include, but are not limited to, landfill natural gas storage or transfer facilities, and natural formations of coal seams, or organic rich deposits such as peat.

The term "groundwater compliance point" is used herein to refer to any point where groundwater is collected and measured for containments. For purposes of this invention, the groundwater compliance point does not mean that a well is actually installed and capable of being used to sample the groundwater at the compliance point. Instead, the compliance point is a point at which a well is or would be located in order to collect groundwater samples so that they can be analyzed for contaminants.

The term "mobile volatile organic compound" as used herein refers to organic compounds that are mobile through the vadose zone and/or through the vadose zone capillary fringe. It is believed that methane gas produced by the methaneogenic source facilitates the migration of the mobile volatile organic compounds into the vadose zone and ultimately into groundwater. However, the precise mechanism causing the migration of the mobile volatile organic compounds into groundwater is not important to the present invention.

The systems and methods of the present invention will be described below generally in the context of their application to a landfill methaneogenic source. However, the systems and methods of this invention are applicable to any methaneogenic source as defined above that contributes to the impact on groundwater by volatile organic compounds.

Figure 1:
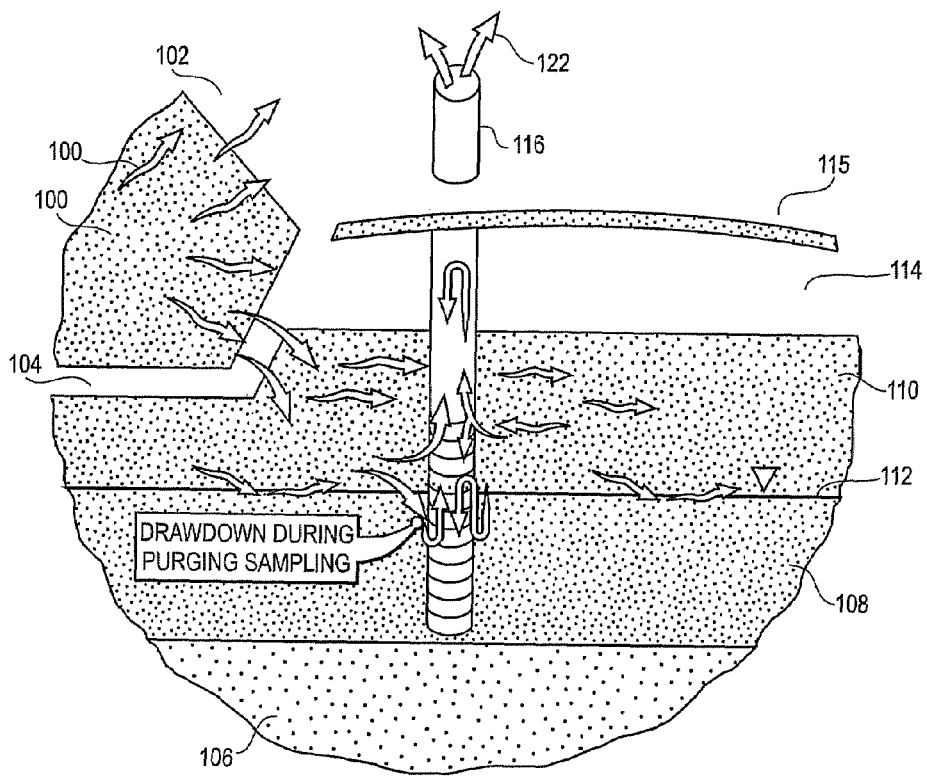
FIG. 1 is a schematic showing generally how gases including methane from landfills permeate and contaminate groundwater.

Referring now to the figures, FIG. 1 is a conceptual model demonstrating the migration of volatile organic compounds into groundwater adjacent to a landfill methaneogenic source. The landfill includes refuse under methaneogenic pressure 100 which includes a top cap 102 and a bottom clay liner 104. The landfill is adjacent to a treatment zone of ground that includes an aquitard or bedrock layer 106, a saturated relatively permeable layer 108, an unsaturated relatively permeable layer 110 (or vadose zone), and a piezometric surface 112 which is located essentially at the interface of saturated relatively permeable layer 108 and unsaturated relatively permeable layer 110. A relatively impermeable upper soil layer 114 lies atop the unsaturated relatively permeable layer 110. A well 116 extends from the surface 115 into the ground such that well 116 passes through the piezometric surface 112 and into saturated relatively permeable layer 108. Well 116 is a source of groundwater from saturated relatively permeable layer 108, piezometric surface 112 and unsaturated relatively permeable layer 110. As shown in FIG. 1, volatile organic compounds 120 (represented by arrows) migrate out of the refuse under methaneogenic pressure 100 and into the unsaturated relatively permeable layer 110 where they collect at the piezometric surface 112. Water 122 withdrawn from well 116 is contaminated with at least some of the mobile volatile organic compounds.

Figure 2:
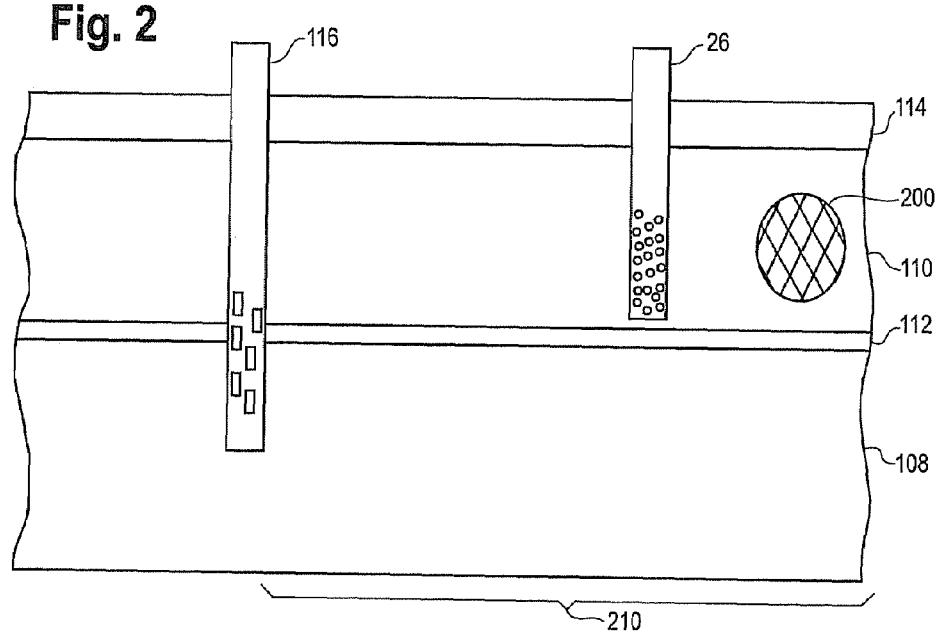
FIG. 2 is a side cutaway view of an embodiment of a system of this invention for protecting groundwater from contamination with volatile organic compounds and/or remediating vol contaminated groundwater.

FIG. 2 is a schematic view of an embodiment of a system of this invention for treating groundwater. The term "treat" and/or "treating" when used herein refers is to both the prevention and inhibition of the migration of mobile volatile organic compounds into groundwater as well as treating contaminated groundwater to reduce the groundwater concentration of volatile organic compounds. FIG. 2 includes a methaneogenic producing source 200, a groundwater compliance point in the form of a well 116 and a gas injection pipe 26 including perforations 30 to facilitate air flow from gas injection pipe 26 into the unsaturated layer in a treatment zone of ground 210 between methaneogenic producing source 200 and groundwater well 116. The ground in which gas injection pipe 26 and groundwater well 116 are located includes an upper soiled or weather zone 114, an unsaturated relatively permeable zone 110, a piezometric interface 112 and a saturated relatively permeable layer 108. Gas injected into gas injection pipe 26 can, in one embodiment, create a pressurized gas curtain in the unsaturated relatively permeable layer 110 (the vadose zone) that prevents the migration of mobile volatile organic compounds located in the methaneogenic producing source 200 and/or located in the treatment zone of ground 210 into the groundwater. Alternatively and/or in addition, an oxygen containing gas can be injected into gas injection well 26 and into the vadose zone in an amount sufficient to establish aerobic conditions that are capable of aerobically decomposing degradable volatile organic compounds into relatively inert degradation by-products.

Figure 3:
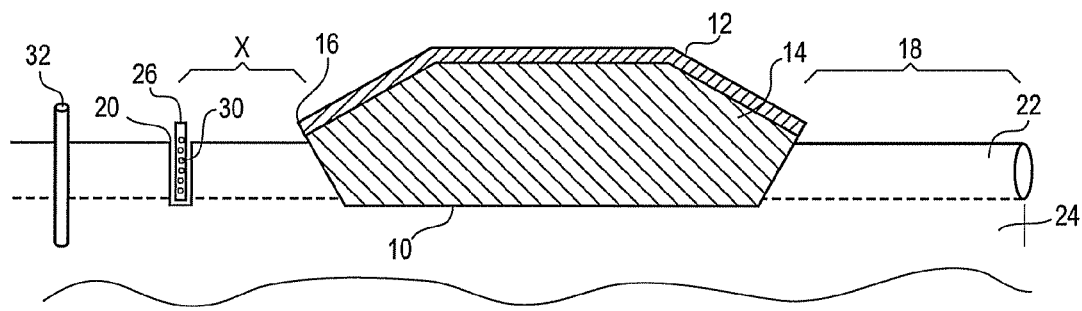
FIG. 3 is a side view of an embodiment of a system of this invention associated with a landfill.
Figure 4:
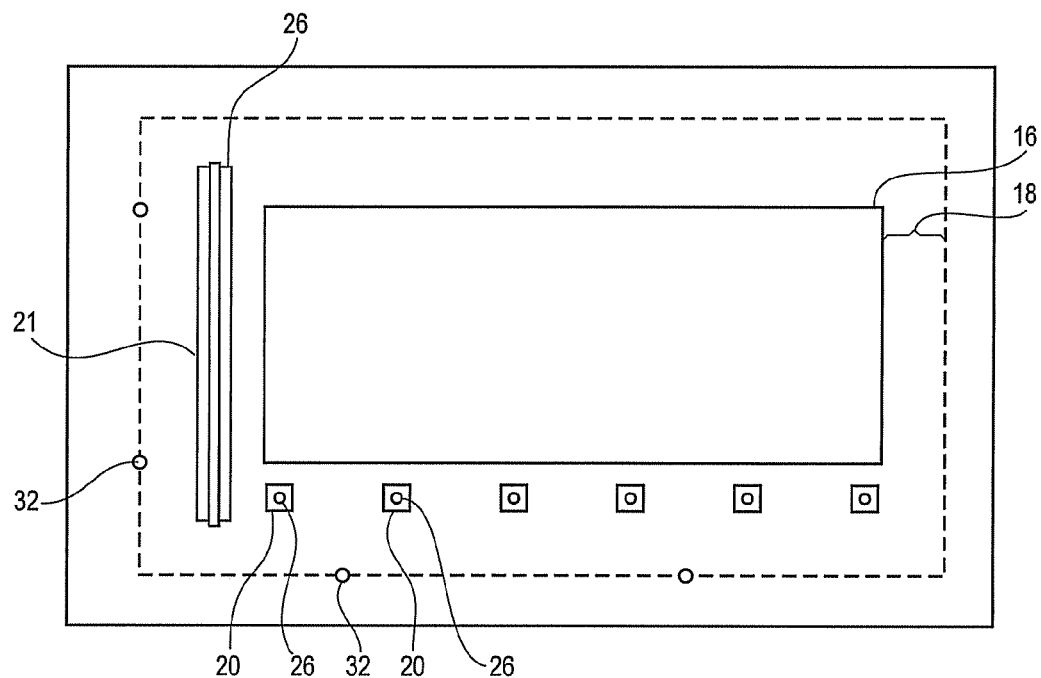
FIG. 4 is an overhead of a system of this invention shown in FIG. 3.

FIGS. 3-4 show a system embodiment of this invention associated with a landfill methaneogenic source. Referring now to FIGS. 3 and 4, a landfill 5 is shown including a bottom liner 10, a top soil cap or seal 12 and a municipal solid waste core 14. Municipal solid waste core 14 may include any waste materials and debris that are typically landfilled. Examples of such materials include organic and inorganic consumer waste, building debris with a significant cellulose component, yard waste and so forth. An important aspect of the municipal solid waste core 14 is that it must include one or more mobile volatile organic compounds—compounds that are capable of migrating into the water table of the soil surrounding the landfill.

Referring once again to FIGS. 3 and 4, landfill 5 includes a perimeter 16 generally defined by landfill bottom liner 10. While most landfills today include bottom liners, it is not important for purposes of the present invention that the landfill include a bottom liner 10. What is important is the location of landfill perimeter 16. The landfill perimeter 16 will typically be defined by the perimeter of the municipal solid waste core or any related seal material such as clay seal material that establishes the periphery of the landfill. The portion of the ground located between perimeter 16 of the landfill of FIGS. 3 and 4 and compliance point 32 is referred to herein as the "treatment zone". Treatment zone 18 will typically include one or more gas injection wells 26 which are described in more detail below and it may also contain groundwater that is capable of being impacted by volatile organic compounds from the landfill.

Treatment zone 18 includes at least one trench 20. Trench 20 is generally constructed such that it is deep enough to extend through vadose zone 22 and into the saturated zone 24 of treatment zone 18. Trench 20 will be located a distance "X" (shown in FIG. 3) from landfill perimeter 16. Distance x is typically a distance of from about 10 feet to 1000 feet or more from the methaneogenic source boundary. The minimum distance "X" from landfill perimeter 16 will be a distance that is sufficient to prevent the migration of air injected into trench 20 from reaching municipal solid waste core 14 of landfill 5 where oxygen containing air could cause dangerous internal landfill combustion. It is preferred that trench 20 will be located at a distance at from 25 feet up to about 200 feet from landfill perimeter 16.

Trench 20 includes at least one gas injection pipe 26 having a first end 28 located in the bottom of trench 20. Gas injection pipe 26 will include at least one and preferably a plurality of perforations 30 that are located on gas injection pipe 26 at a point that causes perforations 30 to be located in vadose zone 22 when gas injection pipe 26 is placed in trench 20. A second end 31 of gas injection pipe 26 is associated with a gas source that is capable of providing pressurized gas to gas injection pipe 26 and into vadose zone 22 via pipe perforations 30. For purposes of this invention, the term trench refers to a natural or manmade hole in the treatment zone that both contains gas injection pipe 26 and that has been backfilled.

An optional compliance point monitoring well 32 may be placed in treatment zone 18. Monitoring well 32 will be deep enough to extend into saturated zone 24 from which groundwater may be withdrawn. Monitoring well 32 should be placed at a distance from landfill perimeter 16 that is greater than the distance X of trench 20 from landfill perimeter 16. Monitoring well 32 is useful for obtaining groundwater samples that can be evaluated for volatile organic compound content which content can be used as a basis for adjusting gas injection into vadose zone 22.

Trench 20 may be lateral or vertical in nature depending upon the orientation of the air injection pipe 26 placed in trench 20. In one embodiment of this invention, a plurality of vertically oriented air injection pipes 26 can be placed in vertical trenches 20 spaced around perimeter 16 of a landfill. In another embodiment, a lateral trench 21 can be constructed around a portion or all of perimeter 16 of landfill 5 and a horizontal air injection pipe 26' can be located in lateral trench 21. In another embodiment a combination of vertical and horizontal air injection pipes 26 and 26' can be placed around perimeter 16 of landfill 5 in order to provide the gas injection coverage necessary to achieve the goals of the present invention. While the gas injection pipes are generally discussed above with respect to the horizontal and vertical directions, it should be noted that the injection pipes can be placed at an angle with respect to the ground surface so long as pipe perforations 30 are located in the vadose zone in order to supply a gas or an oxygen containing gas into and to withdraw gases from the vadose zone of the treatment zone adjacent to the methaneogenic source.

Figure 5:
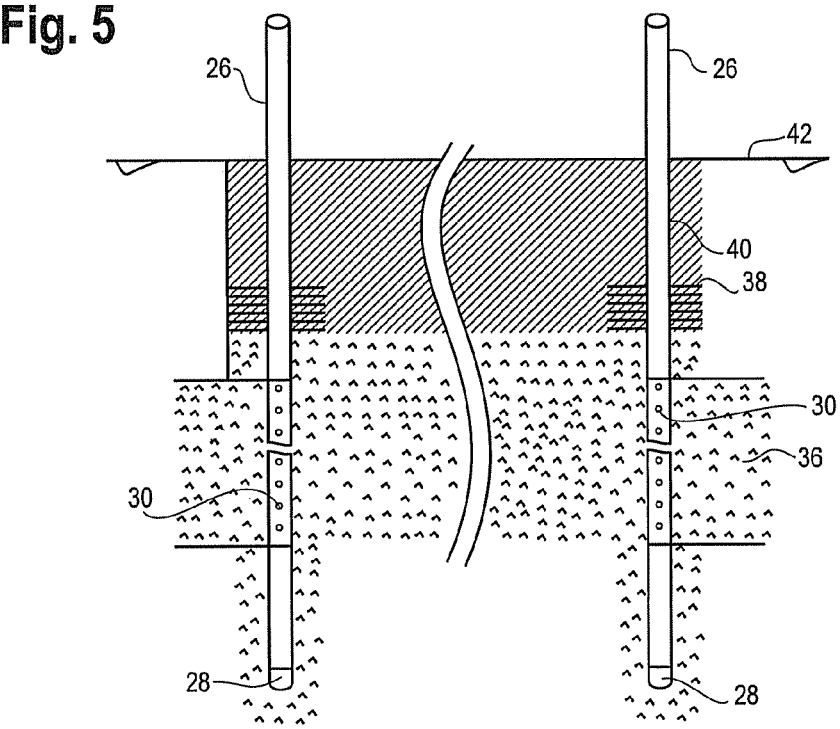
FIG. 5 is a side view of an embodiment of an air injection wells useful in embodiments of systems of the present invention.
Figure 6:
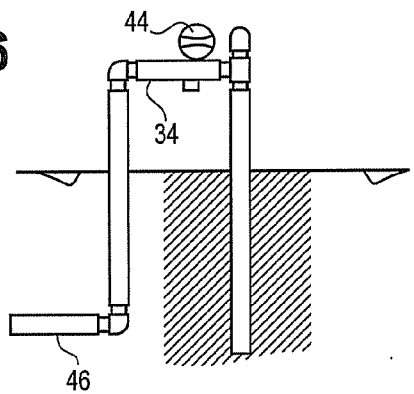
FIG. 6 is a side view of a piping manifold useful in conjunction with air injection pipes useful in system embodiments of the present invention.

One embodiment of a vertical gas injection well 26 is shown in FIGS. 5 and 6. FIG. 5 shows two gas injection wells 26 spaced at a distance determined by local saturated and unsaturated zone flow characteristics. Gas injection pipes 26 include a first end 28 located in the bottom of the vadose zone. First end 28 may optionally extend into the groundwater zone 24 of treatment zone 18. Gas injection pipes 26 include a second end 31 that lies above the ground and that is associated with a piping manifold 34. Piping manifold 34 is also associated with a pressurized gas source. Gas injection pipes 26 further include perforations 30 that are located in vadose zone 22. In one embodiment, perforations 30 are from about ¼ to about 1 inch in diameter holes spaced from 1 to 5 inches apart. In a more preferred embodiment, the perforations range from about ¼ to ¾ inches in diameter and are spaced from 2½ to 4 inches apart.

Gas injection pipes 26 and 26' are preferably sealed in the lateral or vertical trenches before pressurized gas is directed into gas injection pipes 26. In the vertical trench shown in FIG. 5, a seal is formed by placing an inert aggregate material 36 into the trench. Inert aggregate material 36 may be any type of porous material that is commonly used in landfills. Examples of inert aggregate materials include gravel, crushed concrete debris, and so forth. In one embodiment, the aggregate material is gravel having a size of from about ½ to 2 inches and is placed in a manner as to minimize infiltration by fine materials that might inhibit vapor-phase flow of the conduit. A seal material 38 is placed around each air injection pipe 26 above material layer 36. Seal material 38 will typically be a clay or other highly impervious material. Seal material 38 will typically have depth ranging from about 6 inches to about 3 feet or more and more preferably will be from about 8 inches to about 16 inches deep. Compacted backfill 40 is then placed above aggregate material layer 36 and seal material 38 up to the ground surface 42.

FIG. 6 shows a gas injection pipe 26 associated with piping manifold 34. Piping manifold 34 may include a valve 44 located between piping manifold 34 and air injection pipe 26 to allow for the interruption of gas injection into individual gas injection pipes 26. Manifold 34 includes a pipe portion 46 that is associated with a source of gas.

Any type of pressurized gas may be used in the present invention. In one embodiment, the pressurized gas is used to create an air curtain in the vadose zone of the treatment zone of ground that inhibits migration of volatile organic compounds into the groundwater. In this embodiment, the type of gas used is not important so an oxygen free gas, such as nitrogen, could be used. In another embodiment of this invention, air is injected into the vadose zone to create aerobic conditions that are capable of decomposing volatile organic compounds. In this embodiment, the gas injected into the gas injection pipes 26 must be an oxygen containing gas. Oxygen can be supplied as a pure gas, as a mixture with other pressurized gases such as nitrogen, or it can be supplied as compressed air or oxygen enhanced compressed air. In a preferred embodiment, compressed air is injected into the vadose zone 22 via gas injection pipes 26. In this embodiment, the compressed air will typically be supplied by a compressor system.

Figure 7:
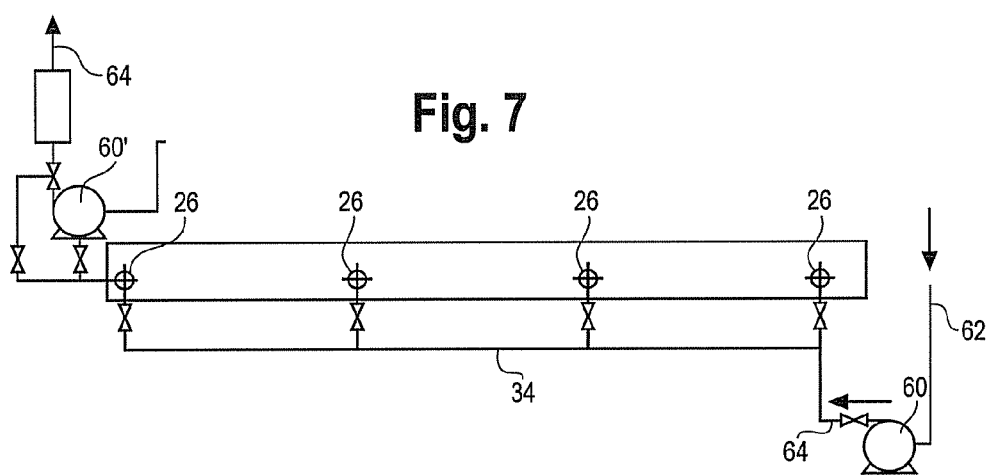
FIG. 7 is a schematic view of a compressor system embodiment useful in the present invention.

FIG. 7 shows a system including two compressors 60 and 60'. Compressor 60 includes an air intake pipe and a compressor discharge wherein the compressed air discharges into piping manifold 34 associated with gas injection pipe(s) 26. Compressor 60' on the other hand draws air from piping manifold 34 and discharges the gas drawn from the vadose zone into the atmosphere at discharge 64. Compressor 60' is used to create a vacuum in gas injection pipe 26 in order to draw air and other gases out of the vadose zone. This operation was added to the system design to enhance lateral flow in the trench and minimize the potential for migration of air towards the waste mass. An additional benefit included providing a system to control flow of the effluent air through a carbon canister for treatment prior to discharge to the atmosphere.

The piping used for gas injection pipes 26 and piping manifold 34 will be made from materials that are commonly used in landfill remediation systems. Any pipe that is located in the ground will typically be manufactured of a plastic material such a polyvinylchloride (PVC) and will have a diameter ranging from about 2 inches to 6 inches or more. Piping that lies outside of the ground may be manufactured of a plastic or metal material depending upon the pressures and process conditions experienced by the various manifold sections.

A method of this invention is performed by identifying a methaneogenic source such as a landfill 5 including a perimeter 16 and a municipal solid waste core 14. The landfill can be an active or an inactive landfill. What is important is that volatile organic compounds are able to migrate from landfill 5 into the surrounding groundwater. Next, at least one and preferably a plurality of vertical trenches 20 or lateral trenches 21 are located around and outside of the perimeter 16 of landfill 5 in treatment zone 18. In one aspect of this invention, it is possible for the landfill to include a single gas injection pipe 26. A single gas injection pipe 26 will be useful where, for example, a single small groundwater source is located at a fixed position outside of the land perimeter. Most often, the method of this invention will use a plurality of vertically oriented gas injection pipes or long runs of hundreds feet or more of horizontal gas injection pipes. Gas injection pipes will be placed in the vadose zone of the treatment zone surrounding the landfill perimeter in a manner that places pipe perforations 30 in the vadose zone. The second end 30 of each gas injection pipe will be associated with a piping manifold 34 that in turn is associated with a gas source such as compressor 60. Gas, such as compressed air, is injected into the vadose zone through gas injection pipes 26 by, for example, compressing air in compressor 60 and directing the compressed air through manifold 34 into gas injection pipes 26 and through pipe perforations 30. The amount of gas injected into the vadose zone in the vicinity of gas injection pipes 26 will vary. In one embodiment, the design criteria consisted of an air flow rate of 215 to 255 standard cubic feet per minute (scfm) under a total operating pressure of 10 to 40 inches water column, gauge (wcg). However, the operating pressure may range from 5 to 100 inches of water.

Where it is desired to create aerobic bioremediation conditions in the vadose zone surrounding gas injection pipe 26, then an oxygen containing gas will be injected into vadose zone 22 by gas injection pipe(s) 26. The injection of oxygen containing gas into the vadose zone will create aerobic bioremediation conditions. That is, the oxygen will promote the growth of aerobic microorganisms and bacteria some of which will be able to biodegrade volatile organic compounds that are aerobically biodegradable. Examples of volatile organic compounds that are aerobically biodegradable include but are not limited to vinyl chloride, 1-2, DCA, chloroethane, and methylene chloride. Where gas is injected into the vadose zone to create a positive pressure gas curtain, then it is not critical that the volatile organic compounds are aerobically degradable compounds. The gas curtain essentially acts as a physical barrier to the migration of volatile organic compounds into the groundwater. Therefore, this embodiment of the invention is capable of mitigating migration of volatile organic compounds of any type through the vadose zone and into the groundwater surrounding a landfill.

The landfill and method of this invention are particularly useful for inhibiting the contamination groundwater with organic chlorides such as trichloroethane (TCE), and tetrachloroethylene (PCE). Both of these compounds are subject to degrade into vinyl chlorides. Therefore, mitigating the migration of a vapor phase source that contain these compounds (such as MSW landfill gas) can significantly reduce the vinyl chloride contamination of groundwater adjacent to some landfills.

EXAMPLE

A pilot study was performed to evaluate the efficacy of the invention. The objective of the pilot test was to determine if an operational upgrade of the out-of-waste gas collection system could affect the dissolved oxygen (D.O.) concentration in shallow groundwater to a point that aerobic degradation of the vinyl chloride could occur naturally. The target goal was to elevate D.O. in groundwater to >3.0 mg/L and oxidation-reduction potential (ORP) to >300 mV. The modification of the subsurface system to these levels for an extended period of time would be conducive to aerobic degradation and removal of vinyl chloride in groundwater. This pilot test did not include the injection of any liquid oxidizers but simply induced a positive flow of air through the cutoff trench to limit the flow of landfill gas into the trench (ideally) and determine if natural oxygen concentrations in the atmosphere could oxidize LFG-related vinyl chloride in groundwater.

A single 3.5 horsepower blower was installed at the header line of the trench and was sized with the assumption that the gravel backfill was 40% porosity. The blower performance criterion target was designed with the following objective in mind:

Air flow rate: 215 to 255 standard cubic feet per minute (scfm)

Total operating pressure: 10 to 40 inches water column, gauge (wcg)

The injection rate chosen was to ensure that the entire trench would be rendered aerobic and remain under positive pressure. A maximum pressure of 5 inches of water column was set as the upper working limit to ensure that oxygen would not enter into the landfill. A monitoring program was established whereby if oxygen levels at gas probes at the perimeter of the landfill exceeded 3% and if temperatures of gas were above 150 degrees F., then the system would be shut down. The air flow in the header and vent were monitored bi-weekly to ensure positive pressure and aerobic conditions were maintained throughout the pilot test.

Pilot Test Results

In order to assess existing conditions before modifying the gas migration control trench, field data for the air samples were taken prior to start-up of the system from three landfill gas wells located nearest the trench, and one gas vent located within the trench. The results show that there was no vacuum or negative pressure (except slightly at the trench vent), thus no active gas extraction was occurring in this portion of the landfill. The vapors sampled in the trench, however, detected oxygen at 15% and the headspace of the monitoring well contained atmospheric levels at 20% oxygen. This indicated that the trench, in passive mode, prevented gas migration into the vadose zone from the waste mass to MW-Z. However, groundwater quality was still affected by gas since vinyl chloride was detected in groundwater at a concentration of 12 ug/L.

The field data from a groundwater well located in the vicinity of MW-Z indicated low levels of dissolved oxygen within the well at 1.1 mg/L. This is somewhat lower than anticipated since there are atmospheric levels of $O_2$ (20%) in the headspace of the well and 15% in the nearby trench riser pipe, but negative pressure of −0.7 inches of water. Research shows that if vadose zone has atmospheric levels of oxygen, then it should diffuse into groundwater in unconfined aquifers at the same levels for at least 3-5 feet bgs before declining substantially with depth. This also indicates that landfill gas has caused a slight anaerobic condition in groundwater, confirmed by a low ORP of 20 mV.

Pilot Test Summary

Day 1—Air was injected into the gas control trench. Start-up monitoring indicated 1.2 inches of water pressure at 284 cfm was achieved in the header pipe with atmospheric levels of oxygen (i.e., 20%). The trench riser pipe nearest MW-Z showed 0.35" pressure at 182 cfm and close to oxygen levels observed in the header pipe (18.6%). The probes in the landfill had similar readings as above and two of the in-refuse gas extraction wells had 0 methane and 17-18% oxygen with 0 pressure. The headspace in groundwater monitoring well MW-Z had 11% methane and 2% oxygen and a slight positive pressure. This change from aerobic to anaerobic conditions in headspace of MW-Z is due to the initial air injection system being under positive pressure and displacing methane that was trapped in the vadose zone before start-up. This showed a rapid connection between changing conditions in the trench and the headspace in the monitoring well. A summary of the field measurements conducted during the pilot test is included on Table 1.

Day 11—Readings for headspace were biased by a clogged filter for the blower. Flow decreased and temperature increased to >150F. A new system of filtration was installed and flow and temperature returned to normal operating levels. The D.O. at MW-Z increased approximately 90% to 2.89 mg/L. ORP increased to 170 mV. This was encouraging showing that the vadose zone was being purged of anaerobic conditions and oxygen was diffusing into groundwater at a rate faster than anticipated.

Day 40—Field measurements for MW-Z were similar for all parameters as shown in the Day 33 data. An additional 3.5 horsepower blower was activated to boost the total flow in the trench to 300 cfm. In addition, a vacuum was hooked up to a temporary monitoring probe installed between the waste mass and the trench to a depth of approximately 20 feet bgs. Analytical testing of VOCs in gas indicated there was no methane in the headspace of MW-Z or the trench riser, but 15,000 ppbv of vinyl chloride was detected in the temporary probe located between the waste mass and the trench.

Day 59—Blower system turned off.

Day 130—Groundwater sample collected from monitoring well MW-Z approximately 2 months after blower system was turned off indicated vinyl chloride was not detected (ND) at a concentrations greater than the laboratory PQL (2 ug/L).

CONCLUSIONS

1. The conversion of an out-of-refuse gas extraction trench to a positive air displacement trench created an aerobic condition in the vadose zone and successfully prevented methane migration. There was no methane detected in the trench risers and the head-space of the monitoring well 24 hours after initial start-up.
2. The development of aerobic conditions in the vadose zone substantially increased the aerobic conditions in groundwater. Dissolved oxygen increased in monitoring well MW-Z from 1.1 mg/L, to 2.89 mg/L. More importantly, ORP increased from 20 mV to over 252 mV. Typically aerobic bioremediation is accomplished by injecting air in both the vadose zone and groundwater simultaneously. It is thought that ideally groundwater needs to have oxygen in the 3 to 6 mg/L range or higher for aerobic degradation, however ORP appears to be the more critical operating parameter to sustain aerobic degradation conditions. Both ORP and D.O. fluctuated most likely due to organic consumption by aerobic bacteria that increased demand on oxygen.
3. This method created a sustainable condition in controlling landfill gas migration from the landfill into the vadose zone and reduced vinyl chloride concentrations in groundwater from 12 ug/L (pre-system start-up) to non-detectable levels in approximately four (4) months.
4. Implementation of a LFG migration control trench with modification to allow vacuum extraction and alternating air injection may be possible to first dechlorinate halogenated organics in the vadose zone before attempting to remediate groundwater contaminants. The pilot test pro-

TABLE 1

Summary of Field Measurements for Aerobic Bioremediation Pilot Test

| Days after (before) system start-up | Header Pipe | | Monitoring Well MW- | | | | |
|---|---|---|---|---|---|---|---|
| | Differential Pressure (inches of water) | Flow (scfm) | Headspace Oxygen (%) | Headspace Methane (%) | Pressure (+ or −) | ORP (mV) | D.O. (mg/L) |
| (50) | | | 20.1 | 0 | (−) | 20 | 1.1 |
| 1 | 1.2 | 284 | 2.4 | 11 | (+) | | |
| 2 | (−4.9) | | 19.3 | 0 | (+) | 74 | 1.9 |
| 4 | (−2.71) | | 19.4 | 0 | (+) | | |
| 11 | 0 | | 18 | 0.1 | (+) | 107 | 2.89 |
| 18 | 0.6 | 245 | 20.2 | 0 | 0 | 210 | 1.6 |
| 26 | 0.3 | | 20.1 | 0 | 0 | 25 | 1.27 |
| 33 | 0.3 | | 20.2 | 0 | 0 | 79 | 2.16 |
| 40 | 0.4 | 300 | 21.1 | 0 | 0 | 58 | 1.07 |
| 45 | 0.5 | 224 | 20.4 | 0 | (+) | 155 | 2.07 |
| 52 | 0.2 | 241 | 19.9 | 0 | (+) | 252 | 2.24 |
| 59 | 0.4 | 300 | 20.7 | 0 | (+) | 253 | 2.13 | vided conclusive evidence that the concentration of D.O. in groundwater can be elevated simply by the modification of a gas control system to allow for the flow of ambient air into the subsurface. The increase of D.O. in groundwater from 1.1 mg/L to 2.89 mg/L (an increase of >250%) and the concurrent elevation of ORP from approximately 20 mV to >250 mV with the simple influx of ambient air provides evidence that the saturated media can be affected by air flow in the vadose zone in a manner to induce biodegradation of vinyl chloride in groundwater.

What is claimed is:

1. A groundwater treatment system comprising:
   a methanogenic source wherein the methanogenic source includes volatile organic compounds;
   a groundwater compliance point;
   a treatment zone of ground between the methanogenic source and the compliance point, the treatment zone of ground including a vadose zone;
   a mobile volatile organic compound source at a location selected from the group consisting of in the methanogenic source, in the treatment zone or in both the methanogenic source and in the treatment zone;
   at least one injection well for injecting gas into the vadose zone of the treatment zone; and
   a positive pressure gas curtain in at least a portion of the vadose zone located between the landfill and the groundwater compliance point.

2. The groundwater treatment system of claim 1 including a plurality of injection wells for injecting gas into the vadose zone of the treatment zone.

3. The groundwater treatment system of claim 2 wherein each of the injections wells is vertical.

4. The groundwater treatment system of claim 1 wherein the injection well for injecting gas is a horizontal injection well.

5. The groundwater treatment system of claim 4 wherein the horizontal injection well for injecting gas is located in a trench in the vadose zone.

6. The groundwater treatment system of claim 2 wherein the plurality of injection wells for injecting gas includes at least one vertical injection well and at least one horizontal injection well.

7. The groundwater treatment system of claim 1 wherein the at least one injection well is a gas injection pipe having a first end located in the vadose zone of the treatment zone, a second end associated with a source of oxygen-containing gas, and a plurality of perforations in a portion of the gas injection pipe in the vadose zone.

8. The groundwater treatment system of claim 1 wherein the volatile organic compounds are compounds that are capable of being oxidized under aerobic conditions.

9. The groundwater treatment system of claim 8 wherein the volatile organic compounds are selected from the group consisting of vinyl chloride, 1,2-DCA, chloroethane, methylene chloride, and mixtures thereof.

10. The groundwater treatment system of claim 1 wherein the methanogenic source is selected from the group consisting of landfills, natural gas storage or transmission vessels, natural formations or deposits and combinations thereof.

11. The groundwater treatment system of claim 1 wherein at least a portion of the vadose zone surrounding the injection well is aerobic.

12. A groundwater treatment system comprising:
    a landfill including a bottom, a top, a perimeter and a layer of organic waste material located above the bottom, the organic waste material including at least one volatile organic compound;
    a groundwater compliance point located outside of the perimeter of the landfill wherein the groundwater compliance point is capable of being contaminated with volatile organic compounds in the organic waste material layer of the landfill;
    a treatment zone located between the landfill perimeter and the groundwater compliance point, the treatment zone further comprising a vadose zone; and
    at least one gas injection well for injecting gas into the vadose zone of the treatment zone located between the landfill perimeter and the groundwater compliance point wherein the at least one gas injection well is a pipe having a first end located in the vadose zone of the treatment zone, a second end associated with a source of oxygen-containing gas, and a plurality of perforations in a portion of the pipe located in the vadose zone.

13. The groundwater treatment system of claim 12 including a plurality of gas injection wells located between the landfill perimeter and groundwater compliance point.

14. The groundwater treatment system of claim 13 wherein the plurality of gas injection wells is selected from vertical gas injection wells and horizontal gas injection wells.

15. The groundwater treatment system of claim 12 wherein the at least one volatile organic compound is a compound that is capable of being oxidized under aerobic conditions.

16. The groundwater treatment system of claim 15 wherein the at least one volatile organic compound that is capable of being oxidized under aerobic conditions is selected from the group consisting of vinyl chloride, 1,2-DCA, chloroethane, methylene chloride and mixtures thereof.

17. The groundwater treatment system of claim 12 wherein the at least one gas injection well is an air injection well.

18. The groundwater treatment system of claim 12 including a positive pressure gas curtain in at least a portion of the vadose zone located between the landfill and the groundwater compliance point.

19. The groundwater treatment system of claim 12 wherein the gas injection well is a pipe including a slotted portion located in the vadose zone and having the second end attached to a pressurized air source.

20. The groundwater treatment system of claim 12 including a plurality of vertical air injection wells wherein each vertical air injection well is separated from at least one other vertical air injection well by a distance of from about 25 feet to about 1000 feet.

* * * * *